Figure 1:
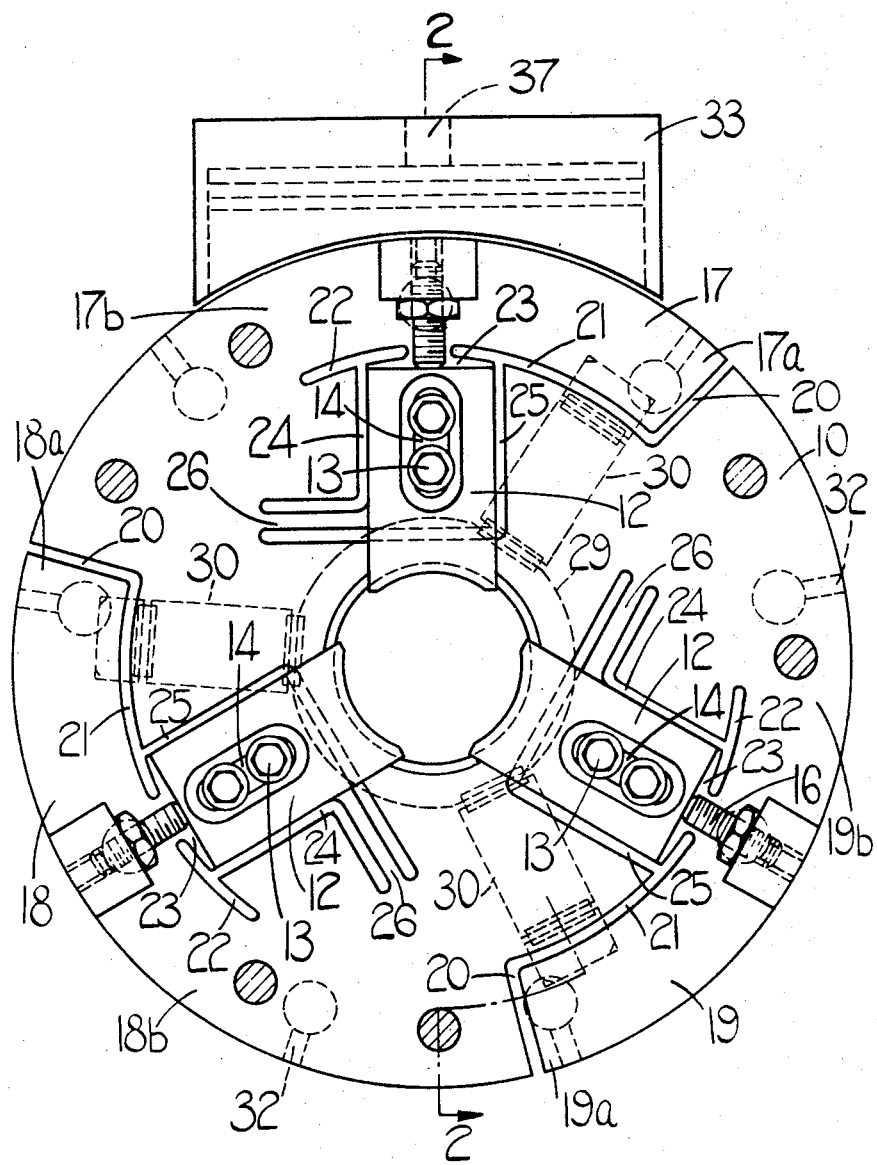

United States Patent
Sykes

[15] 3,685,844
[45] Aug. 22, 1972

[54] WORKPIECE HOLDERS

[72] Inventor: Alfred Ernest Sykes, 329 Leicester Road, Markfield, England

[22] Filed: April 23, 1970

[21] Appl. No.: 31,151

[30] Foreign Application Priority Data

April 29, 1969 Great Britain............21846/69

[52] U.S. Cl. .....................279/4, 279/106, 279/110
[51] Int. Cl. ....B23b 31/10, B23b 31/18, B23b 31/30
[58] Field of Search..........279/1 D, 4, 23, 41, 46, 50, 279/121, 123, 106, 110

[56] References Cited

UNITED STATES PATENTS

| | | | |
|---|---|---|---|
| 3,087,737 | 4/1963 | Werth | 279/1 D |
| 2,998,259 | 8/1961 | Farnsworth | 279/50 |
| 2,994,538 | 8/1961 | Farnsworth | 279/50 |
| 2,873,121 | 2/1959 | Hahn | 279/1 D |
| 2,709,599 | 5/1955 | Mann | 279/46 X |
| 3,411,796 | 11/1968 | Decker | 279/46 |
| 2,082,345 | 6/1937 | Lasser | 279/46 UX |
| 3,006,654 | 10/1961 | Benjamin | 279/46 X |
| 3,123,433 | 12/1964 | Ross | 279/123 UX |
| 1,956,318 | 4/1934 | Draper | 279/106 X |

Primary Examiner—Francis S. Husar
Attorney—Holman & Stern

[57] ABSTRACT

A workpiece holder in which a body formed of resilient material has a plurality of workpiece engaging members, at least one of the members being connected to a free end portion of finger, with the finger being integrally connected to the body at the opposite end portion whereby the free end portion of the finger and the member connected thereto can flex relative to the body about its integrally connected end portion so as to be movable in inward and outward directions. Means are also provided to apply a force to said free end portion for moving it and the member in one of such directions while the resilience of the body material will effect movement of such components in the opposite direction.

5 Claims, 5 Drawing Figures

WORKPIECE HOLDERS

This invention relates to workpiece holders such as chucks and mandrels and has as its object the provision of such a workpiece holder in an improved form.

In accordance with the invention, there is provided a workpiece holder comprising a rotatable body of resilient material and having a plurality of workpiece engaging members, a finger integrally connected at one end portion to the body and having an opposite free end portion circumferentially spaced from the end portion connected to the body, said free end portion being provided with an integrally connected radially extending tongue. One of said workpiece engaging members being mounted on said tongue, a leaf portion integrally connected with the tongue at a location remote from the connection of the tongue with said free end portion, said leaf portion extending at substantially right angles to the tongue and being integrally connected to the end portion of finger integrally connected to the body, with the leaf portion providing lateral stability to its tongue, said free end portion, tongue and workpiece engaging member being adapted to flex relative to the body about the integrally connected end portion of the finger for effecting movement of the free end portion in generally radial directions with respect to the axis of rotation of the body, and means operably related to the free end portion of the finger for applying a force to flex the free end portion, tongue and workpiece engaging member in one radial direction, the resilience of the material of the body and the finger causing the free end portion, tongue, and workpiece engaging member, to move in the other radial direction when the force is removed.

Preferably, a plurality of said fingers are provided and are connected respectively to the plurality of workpiece engaging members. The body may be in the form of a disc arranged so that when the workpiece engaging members are in their operative positions in which they engage and hold a workpiece, the latter will be disposed on one side of the disc so as to project therefrom. Alternatively the body may be in the form of a tubular (preferably cylindrical) member and in this case the workpiece when engaged and held by the workpiece engaging members would extend through the body.

Preferably, said means for applying a force to the finger or fingers is arranged to move the finger or fingers outwardly where the workpiece engaging members are adapted to engage the exterior of a workpiece and inwardly when said members are adapted to engage the interior of the workpiece. Said means may be actuated manually or may comprise means which may be mechanical, or hydraulic or pneumatic or of any other convenient form.

Figure 2:
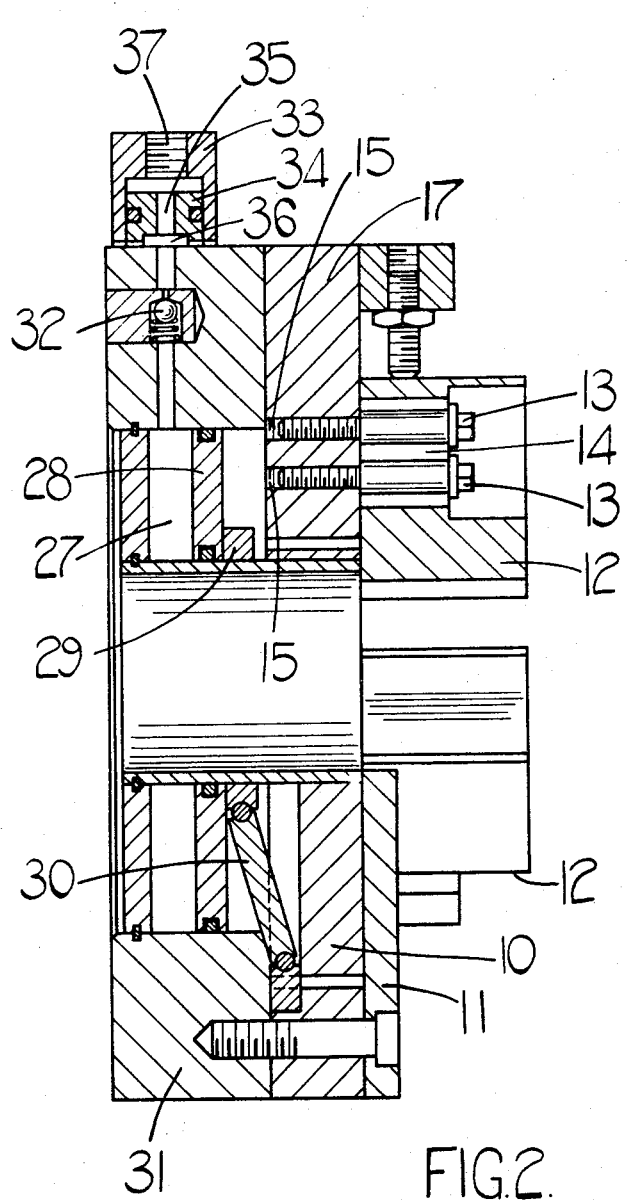
Figure 3:
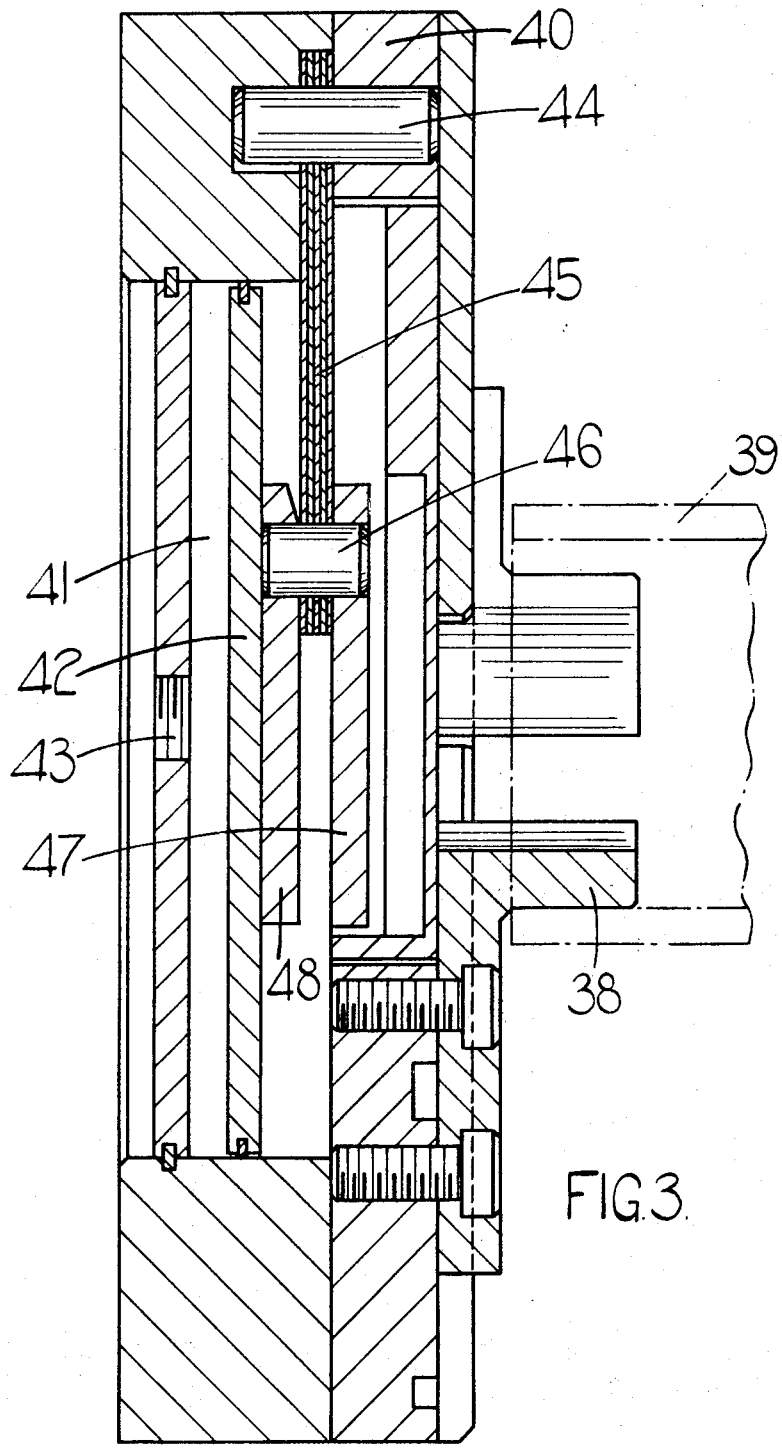
Figure 4:
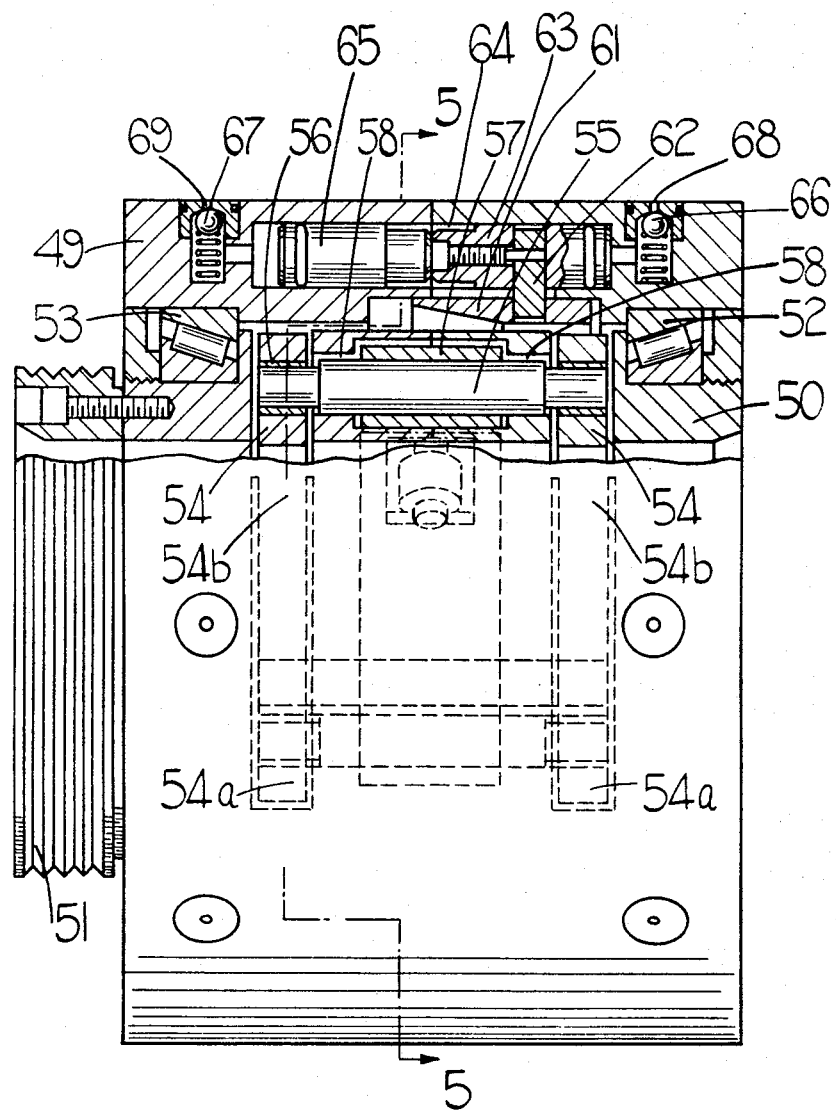
Figure 5:
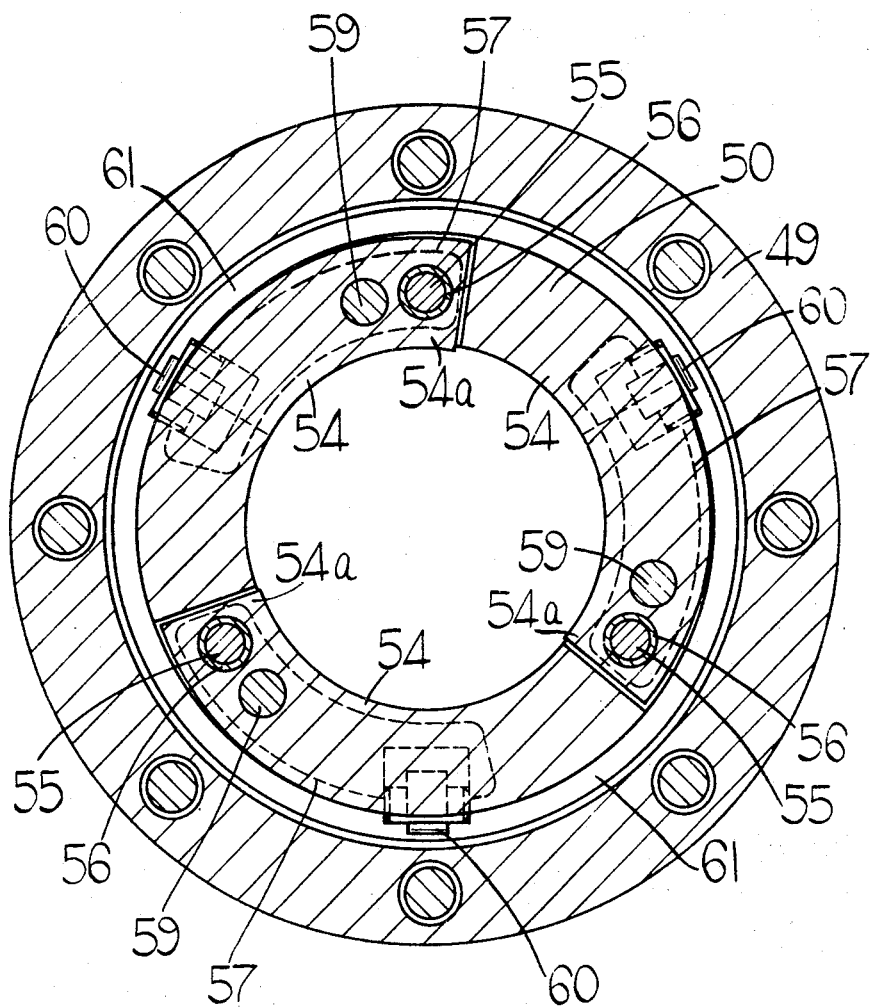

The invention will now be more particularly described with reference to the accompanying drawings wherein FIG. 1 is an end view and FIG. 2 a sectional side view (on the line 2—2 of FIG. 1) of one form of a workpiece holder in accordance with the invention, FIG. 1 being shown with a cover plate removed, FIG. 3 is a sectional side view showing an alternative form of workpiece holder in accordance with the invention, and FIGS. 4 and 5 are respectively a part-sectional side view and a section on the line 5—5 of FIG. 4 of another alternative construction of workpiece holder in accordance with the invention.

Referring firstly to the embodiment shown in FIGS. 1 and 2 a workpiece holder shown therein is in the form of a chuck having a body 10 which is of generally disc-like form. As shown in FIG. 2 said body 10 is connected on one side to a cover plate 11 although said cover plate is removed from the view shown in FIG. 1. Furthermore the body 10 is formed of any convenient resilient material such as an alloy steel.

There is also provided a plurality of workpiece holders 12 comprising jaws which are adapted at their inner ends to engage and grip the exterior of a workpiece. Each workpiece engaging member or jaw 12 is adjustably mounted by means of two screws 13 which project through a slot 14 formed in the jaw and into threaded holes 15 formed in the body 10. There are also provided a plurality of screwed adjustable stops 16 for limiting the outward movement of each workpiece engaging member 12.

The chuck is provided with at least one and preferably as shown a plurality of fingers, there being depicted in the construction shown in FIGS. 1 and 2 three such fingers corresponding in number to the number of workpiece engaging members 12. These fingers are indicated by reference numerals 17, 18 and 19. It is however to be understood (as mentioned above) that there may be only one of such fingers so that one of the workpiece engaging members 12 would be mounted on the one finger so as to be movable as hereinafter described, the remainder of the workpiece engaging members then being fixed in use although they may be adjustably mounted as above-described.

In the embodiment shown in FIGS. 1 and 2 the three fingers 17, 18 and 19 each have a free end portion indicated by reference numerals 17a, 18a and 19a respectively and each finger is integrally connected to the body 10 at that end portion (indicated respectively by reference numerals 17b, 18b and 19b) opposite to the free end portion. As will be seen from FIG. 1 each finger is formed by cutting slots as indicated by reference numerals 20, 21 and 22 through the thickness of the body 10. Furthermore there is provided on each free end portion a radially inwardly extending integral tongue 23 on which the associated workpiece engaging member 12 is mounted, each tongue being defined between further slots 24 and 25 which are each of right angle form so that at their inner ends they define therebetween a leaf portion 26 which is integrally connected to the associated tongue 23 at a position remote from the connection between the tongue and the free end portion. Each of said leaf portions 26 provides lateral stability to its integral tongue 23.

As above described it will be appreciated that since the body 10 is formed of resilient material the free end portions of the fingers 17, 18 and 19 together with their tongues will be able to flex about their integrally connected end portions 17b, 18b and 19b so that they can move inwardly and outwardly relative to the central axis of the body 10.

For the purpose of moving said fingers 17, 18 and 19 in an outward direction there is provided fluid pressure actuated means in the form of a cylinder 27 and a piston 28. The piston 28 is of annular form sealingly engaged with said cylinder and connected on one side to a collar 29 which in turn is connected to the three arms 30 of a toggle mechanism, the inner end of each arm being connected by a bearing to the collar 29 while the outer end of each arm 30 is connected by a similar bearing to an abutment formed in the fingers 17, 18 and 19. At a plurality of positions around the periphery of the chuck, namely in a backing plate 31 connected to that side of the body 10 opposite to the cover plate 11 are inlet valves 32 and there is also provided an arcuate pressure box 33 containing an arcuate piston 34 in which is formed a slot 35 communicating at its inner end with a groove 36. The chord of the body 10 which is spanned by the pressure box 33 is at least equal to the chordal distance between any two of the inlet valves 32 so that with the pressure box stationary and the body 10 rotating said body can be stopped in any position and once stopped will always have at least one of the inlet valves 32 in communication with the groove 36 and slot 35 in the piston 34. Thus pressurized air can be admitted to the pressure box 33 via a connection 37 and such pressurized air will first of all force the piston 34 inwardly to form a seal onto the backing plate 31 when the chuck has been stopped. The pressurized air will then pass the appropriate inlet valve 32 and into the cylinder 27 to move the piston 28 from left to right as seen in FIG. 2 so straightening the toggle mechanism 30 and thereby pushing each of the free end portions of the fingers 17, 18 and 19 outwardly. This in turn will move the associated workpiece engaging members 12 outwardly as well and thereby permit the insertion or removal of a workpiece from between the inner ends of said members 12. The valves 32 are relatively loose fitting so that when the pressure is removed from the pressure box 33 pressurized air can escape around said valves from the cylinder 27 and since the free end portions of the fingers 17, 18 and 19 will have been stressed in being moved outwardly by said toggle mechanism the resilience of said material forming the fingers and the body 10 will cause the fingers to move radially inwardly and thereby enable the inner ends of the workpiece engaging members 12 to engage a workpiece if the latter has been placed in position in the chuck, it being understood of course that the workpiece engaging members will be initially adjusted to a positions such that engagement of the workpiece will occur before the free end portions have moved sufficiently far inwardly to positions in which they would be unstressed. In other words when the members 12 carried by the tongue of the free end portions are gripping a workpiece they will be sufficiently flexed so that they grip the workpiece by the resilience of the material forming said fingers and the body 10, whereas when it is required to release the workpiece the fingers will be further stressed by operating the piston 28 and toggle mechanism 30 to move the free end portions outwardly. It will also be appreciated that the fingers in their movement between a release position and a gripping position will move in a plane parallel to the plane of the body 10 so that the inner ends of said workpiece engaging members 12 will be able to obtain a secure grip over the whole length of a cylindrical or parallel sided workpiece.

In the alternative embodiment shown in FIG. 3 the chuck depicted therein has a plurality of jaws 38 which are adapted to engage the interior of a hollow workpiece shown in dotted lines by reference numeral 39. There is also provided a plurality of fingers 40 which may be formed in a manner generally similar to that described with reference to FIGS. 1 and 2 and there is also provided fluid pressure actuated means for moving the fingers. In this case however said fluid pressure actuated means comprises a cylinder 41 and a piston 42 and a connection is made to the cylinder 41 via a central aperture 43 through which pressurized air can pass into the cylinder. Each of the fingers 40 (only one of such fingers is indicated in FIG. 3) is connected via a pin 44 to a flexible link 45 which is made up of a plurality of strips of flexible material and the inner end of each link 45 is secured to a further pin 46 and held between two parts 47 and 48 connected to the piston 42. Thus movement of the piston 42 from left to right as shown in FIG. 3 will result in the inner end of each link 45 moving in a direction parallel to the axis of the piston thereby causing the outer end of each link to be moved inwardly. This in turn will move inwardly the associated finger 40 and will similarly move the jaws 38 inwardly closer towards each other so as to release the component 39. When the air pressure in the cylinder 41 is released the natural resilience of the fingers 40 will again cause the jaws 38 to expand and grip the component 39 or another similar component loaded into position.

Referring now to the construction shown in FIGS. 4 and 5 this construction comprises a chuck of generally tubular cylindrical form, there being an outer stationary part 49 and an inner tubular body 50 which is connected at one end to a pulley 51 thereby said body 50 can be rotated relative to the stationary part 49 on bearings 52 and 53. On each side of the median diametral plane of the body 50 there is provided a plurality of fingers 54 which are each formed by cutting a U-shaped slot through the thickness of the wall of said body 50 so that each finger is free at one end 54a and is integrally connected at its other end 54b to the remainder of the body, the body being made of a resilient material such as an alloy steel as before. There are thus provided two sets of fingers at opposite axial ends of the body and the fingers of one set are aligned with the fingers of the other set looking in an axial direction. Each axially aligned pair of fingers 54 is interconnected by an axially extending pin 55 which as shown in FIG. 4 extends at each end into a bush 56 fitted to the adjacent finger and intermediate its ends the pin 55 extends through a bore formed in an arm 57. As will also be seen from FIG. 4 there is a clearance indicated by reference numeral 58 between that part of the pin 55 intermediate its ends and the body and also between the body and said arm 57. Intermediate its ends each arm 57 is mounted on a fulcrum pin 59 mounted in the body and at that end of each arm opposite to the pin 55 is a roller 60 carried by a suitable bracket connected to the arm. Each of said rollers 60 is adapted to engage a tapered ring 61 which is connected by means of lugs 62 to a plurality of circumferentially spaced pistons 63, only one lug and one of such pistons being seen in FIG. 4. Each piston 63 is mounted in one end of a cylinder 64 in the other end of which is a further piston 65 and non-return valves 66 and 67 are provided adjacent to ports 68 and 69 for the purpose of admitting pressurized fluid to one end or the other of the cylinder 64. All of the circumferentially spaced cylinders 64 and associated pistons 63 and 65 operate in the same manner so that description of one such assembly will suffice.

Thus looking at FIG. 4 if pressurized fluid is admitted via ports 68 past the non-return valve 66 into the right-hand end of the cylinder 64 the two pistons 63 and 65 will be moved to the left and the tapered ring 61 will also be moved to the left. Said tapered ring will then engage the rollers 60 on the arms 57 and this will have the effect of pivoting said arms about their pivot pins 59 so that the pins 55 are moved radially outwardly. Said pins 55 in turn will move the fingers 54 radially outwardly and therefore release any component previously held by the fingers and extending through the tubular body 50. A new component can then be inserted into the tubular body 50 and pressurized fluid admitted to the left-hand end of the cylinder 64 as seen in FIG. 4 via the port 69 while pressure is released from the right-hand end of said cylinder 64. This in turn will move the tapered ring 61 from left to right as seen in FIG. 4 and the fingers 54 will then be able to move radially inwardly under the resilience of their connection to the remainder of the tubular body 50 so as to exert a resilient grip on the new component placed in the chuck. It is of course understood that with the tapered ring 61 in its right-hand position as shown in FIG. 4 the fingers 54 would naturally move radially inwardly to a position which is somewhat nearer to the axis of the tubular body 50 in the absence of a component in said tubular body. If the component is therefore in position it will be gripped by inward radial contraction of the free ends of the fingers 54 when the tapered ring 61 is moved from left to right. As is the case with the construction described in FIGS. 1 and 2 however the free end of each finger 54 will move in a plane parallel to a diametral plane of the body 50 so that a firm and secure grip can be obtained over a finite axial length of a component inserted into the chuck.

In the above-described construction, the free ends of the fingers themselves act as the workpiece engaging members or jaws although separately formed jaws may be attached to said fingers instead. Furthermore in an alternative construction a generally tubular chuck as shown in FIGS. 4 and 5 may have only one movable finger (which may have an attached or integrally formed jaw) and this movable finger would co-act with a plurality of fixed jaws.

In the construction shown in FIGS. 1 and 2 as an alternative to the toggle mechanism 30 for actuating the fingers, a hydraulically actuated thrust pad may be placed in each of the slots 21, each pad being expandable by hydraulic pressure to move the fingers outwardly when desired.

Having thus described my invention what I claim as new and desire to secure by Letters Patent is:

1. A workpiece holder comprising a rotatable body of resilient material and having a plurality of workpiece engaging members, a finger integrally connected at one end portion to the body and having an opposite free end portion circumferentially spaced from the end portion connected to the body, said free end portion being provided with an integrally connected radially extending tongue, one of said workpiece engaging members being mounted on said tongue, a leaf portion integrally connected to said tongue at a location remote from the connection of the tongue to said free end portion, said leaf portion extending at right angles to the tongue and being integrally connected to the end portion of the finger connected to the body, with said tongue providing lateral stability to its tongue, said free end portion, tongue and workpiece engaging member being adapted to flex relative to the body about the end portion of the finger integrally connected to the body for effecting movement of the free end portion, tongue and workpiece engaging member in generally radial directions with respect to the axis of rotation of the body, and means operably related to the free end portion for applying a force to flex said free end portion, tongue and workpiece engaging member in one radial direction, the resilience of the material of said body and the finger causing the free end portion, tongue and workpiece engaging member to move in the other radial direction when the force is removed.

2. The workpiece holder as claimed in claim 1, in which said force-applying means includes a toggle-mechanism and fluid-pressure means operably coupled with the toggle-mechanism for actuating the toggle-mechanism.

3. The workpiece holder as claimed in claim 2 in which said toggle-mechanism includes toggle links of flexible form.

4. The workpiece holder as claimed in claim 2 in which said fluid-pressure actuated toggle-mechanism comprises a piston and cylinder, said body having a plurality of radially extending, circumferentially spaced ports, each having a non-return valve for admitting pressurized fluid to the cylinder, a stationary arcuate pressure box and an arcuate piston mounted within the pressure box provided on the exterior of the body, said pressure box extending over an arcuate distance at least equal to the arcuate spacing between any two adjacent ports, and said arcuate piston being adapted to be sealingly engaged with the exterior of the body when the body is stationary and having passage means for admitting pressurized fluid from the pressure box to at least one of the ports when the toggle-mechanism is to be actuated.

5. A workpiece holder as claimed in claim 1 in which said free end portion, tongue and leaf portion are all defined by slots provided in said body.

* * * * *